United States Patent [19]

Ingraham

[11] 4,237,186

[45] Dec. 2, 1980

[54] THERMOPLASTIC RESIN-COATED METALLIC SUBSTRATE AND THE METHOD OF PRODUCING THE SAME

[75] Inventor: Glen E. Ingraham, Lebanon, N.J.

[73] Assignee: Colorguard Corporation, Raritan, N.J.

[21] Appl. No.: 928,911

[22] Filed: Jul. 28, 1978

Related U.S. Application Data

[63] Continuation of Ser. No. 546,701, Feb. 3, 1975, abandoned.

[51] Int. Cl.$^2$ .............................................. B32B 15/00

[52] U.S. Cl. .................................... 428/379; 264/129; 264/174; 264/178 R; 264/237; 427/117; 427/118; 427/409; 427/435; 428/375; 428/380; 428/383; 428/398; 428/457; 428/458

[58] Field of Search ............... 428/364, 375, 379, 380, 428/383, 398, 457, 458; 427/409, 435, 117, 118; 264/129, 174, 178 R, 237

[56] References Cited

U.S. PATENT DOCUMENTS

| | | | |
|---|---|---|---|
| 2,471,752 | 5/1949 | Ingmanson | 156/244 |
| 2,736,897 | 2/1956 | Parsons | 156/244 |
| 2,840,264 | 6/1958 | Groves | 156/331 |
| 3,135,620 | 6/1964 | McGrath | 427/434 |
| 3,377,303 | 4/1968 | Peerman et al. | 260/18 N |
| 3,449,273 | 6/1969 | Kettering et al. | 260/18 N |
| 3,449,423 | 6/1969 | Nazy et al. | 260/18 N |
| 3,802,908 | 4/1974 | Emmons | 427/409 |
| 3,823,045 | 7/1974 | Hielema | 156/244 |
| 3,941,866 | 3/1976 | Ingraham | 264/135 |

*Primary Examiner*—James J. Bell
*Attorney, Agent, or Firm*—Daniel J. Reardon

[57] ABSTRACT

A metallic substrate and a thermoplastic resinous coating are bonded to one another by a resinous hot melt adhesive. The method of applying the coating to effect the bond includes applying to the metallic substrate a resinous hot melt polyamide adhesive composition which has been found to adhere firmly to the metallic substrate and to form a secure bond with the molten thermoplastic resin extruded onto said hot melt adhesive at high rates of speed.

38 Claims, 4 Drawing Figures

THERMOPLASTIC RESIN-COATED METALLIC SUBSTRATE AND THE METHOD OF PRODUCING THE SAME

This application is a continuation of copending application Ser. No. 546,701 filed Feb. 3, 1975 (now abandoned) and entitled A THERMOPLASTIC RESIN-COATED METALLIC SUBSTRATE AND THE METHOD OF PRODUCING THE SAME.

BACKGROUND OF THE INVENTION

The coating of metallic substrates with an unbonded ply of plasticized thermoplastic resin has been well established commercially heretofore. The incorporation in the resin coating compositions of various standard anti-oxidants, light stabilizers and other conventional additives has resulted in coated metallic materials manifesting a flexibility without cracking, an impact hardness and resistance to abrasion which makes them particularly useful in a variety of applications including chain-link fence.

The metallic substrate of these coated materials is rendered vulnerable however, where a single-ply of unbonded plastic is present, because of the relative ease with which the resin coating can be stripped from the substrate, a particular concern, for example, where the coated material is chain-link fence and where this material is used in areas subject to the activity of vandals, such as heavily industrialized locations, public playgrounds and the like.

The bonding of certain thermoplastic resin coatings to a metallic substrate has been known to reduce this ease of removal. Bonding has been accomplished, illustratively, by treating wire, for example, with a primer heated to an elevated temperature and the composite of wire and primer passed through a fluidized bed of vinyl resin powder. The wire substrate used commercially in the practice of this latter process has been found to be ungalvanized steel. Inherent in this process, additionally, has been the formation of a microporous coating of limited thickness, i.e., about 7–10 mils, and this vinyl coating has been found to evidence reduced resistance to ultra-violet radiation over a sustained period. The relative thinness of the coating which can be achieved by this method has been found to permit corrosive atmospheres even in the absence of removal of the coating. This vulnerability is, of course, of particular significance where the substrate is, illustratively, ungalvanized steel. The production of vinyl coated metallic substrates employing plastisols or organosols of vinyl chloride resins has also been projected, but the combination of steps including particularly the removal of diluents from the coating and the absorption of plasticizers in the fusion phase tend to render the processes uneconomic, both by reason of the reduced speeds at which, for example, wire must pass through the coating step, e.g., up to about 300 feet per minute, and the high temperature baking ovens necessary for fusion, utilizing high levels of electric energy.

Securing a plastic composition to a metal element is disclosed specifically and by way of further illustration in U.S. Pat. No. 3,795,540. The bonding of an extruded plastic cover of polyvinyl chloride, rubber, impregnated paper or preferably polyethylene, for example, is suggested by this reference using a copolymer of ethylene and an ethylenically unsaturated carboxylic acid, particularly ethylene-vinyl acetate copolymer. This reference is not concerned with a product capable of being produced at high speeds in a continuous process and incorporating a significantly superior bond of coating to substrate. The formation of an adhesive-coated substrate and a substrate to which the polyethylene polymer is thereupon applied is undertaken under inherently slow moving conditions in which the adhesive must be extruded into the substrate. Thus, the adhesive employed provides a bond between a protective polymeric coating such as poly (vinyl chloride) and a metallic substrate which is inadequate particularly for high-speed metal forming operations; for example, the production of wire products such as chain-link fence.

A further method suggested heretofore for producing a metal component coated with a bonded plastic composition is that described in U.S. Pat. No. 2,531,169 wherein the patentee describes the deposition upon wire of a phenolaldehyde modified polyvinyl enamel, a thermoset lacquer, as an adhesive, with sequential baking, and, in order to secure the necessary thickness, passing the wire through the enamelling bath and baking oven a number of times, after which the enamelled wire is transmitted through a vinyl dispersion or plastisol with heating of the latter coating as well. This latter coating step is also repeated several times. This method is obviously cumbersome and uneconomic. This patent suggests that extrusion techniques are unsuitable for deposition of thin plies of plastic material because of the tendency to damage the undercoat previously placed on the substrate and because of nonuniformity in the resulting layer.

Certain of these disadvantages elucidated, illustratively, in the disclosure of U.S. Pat. No. 2,531,169 are apparent in U.S. Pat. No. 3,532,783 wherein a polyethylene coating is attached by means of a high density polyethylene modified with maleic acid to a wire substrate. This latter patent suggests that polyvinyl chloride may be substituted for polyethylene if a suitable adhesive can be found. The adhesive suggested is VMCH, a vinyl chloride-vinyl acetate copolymer that is deposited only from solution. Under normal application this vinyl composition is air dried or baked to eliminate residual solvents. However, even if force dried, the desired state for application will be effected only very slowly. Once deposited, in any event, on the metal substrate with a subsequent overcoat layer of plasticized vinyl compound, the adhesive is softened by the plasticizer of the vinyl chloride resulting in poor bond strength. The process described in this patent proceeds inherently at a slow pace because of the necessity to heat the wire substrate that is to be coated in order to effect a proper deposition of adhesive. The solid flake adhesive employed, in addition, presents a material problem in securing a uniform coat, enhancing the dependency of the process on the preheating step.

If, accordingly, a product could be devised comprising a metallic substrate, and particularly wire, and, as a second layer or ply, a hot melt polyamide adhesive capable of bonding firmly the wire and a further ply of extrudable thermoplastic resin and particularly polyvinyl chloride or copolymers thereof having a uniform thickness sufficient to provide effective and prolonged protection to the wire substrate, a product of prolonged life span would be obtainable, reducing, and indeed, substantially eliminating the replacement now periodically required of materials which are increasingly expensive or unavailable, and thus constitute a significant advance in the state of the art. Similarly, if an economically and technically feasible, continuous, high speed system of providing a product such as the foregoing wherein the heat absorbing qualities of the metallic substrate are used to cool the adhesive could be devised, an advance of significant merit would also be effected.

Various polyamide adhesives have been proposed generally for use with polyvinyl chloride and with metals but no mode of application, much less one that is economically efficacious, or capable of uniform and continuous performance at high speeds; nor indeed any suggestion as to specific adhesives appropriate for simultaneous application to metals and polyvinyl chloride to secure a permanent bond is apparent in these teachings.

SUMMARY OF THE INVENTION

It is, therefore, a general object of this invention to provide a laminate including a metallic substrate and a protective thermoplastic resinous ply or coating wherein the coating is bonded to the substrate in such a manner as to preserve the composite assembly of coating and substrate over an extended period of time and under extremes of environmental attrition not attainable heretofore.

It is a further object of this invention to provide means for producing, in a continuous process and at speeds up to 2000 feet per minute, a wire to which has been bonded to extrudable thermoplastic resin coating of a thickness sufficient to assure protection against extremes of temperature and humidity, as well as against abrasion and oxidizing agents such as mineral acids, sea water and other dilute solutions of salt and alkali, while conveying an esthetically pleasing effect.

A still further object of this invention is to provide a coated wire such as provided hereinabove which will have a flexibility sufficient so that it may be flexed or bent to form chain-link fence fabric without cracking and in which the thermoplastic resin employed is preferably, and significantly so, polyvinyl chloride having improved resistance to peeling and thus to deliberate human effort to destroy it by cutting of the protective or insulated coating.

Another and particular object of the invention is to provide a method of bonding a vinyl chloride resin composition to a galvanized steel wire suitable for use in chain-link fabric in a high speed process wherein the bonding component is a hot melt polyamide resin containing composition.

Accordingly, a novel metallic-based laminate of unique durability, including significantly improved and effective resistance to attrition by a vast variety of environmental agents and forces and comprising a metallic substrate, a polyamide adhesive applied thereto and having critical parameters of utility and a protective, extrudable thermoplastic resin and particularly a plasticized vinyl chloride resin outercoat permanently bonded by said adhesive to said wire has now been devised. In addition, it has been discovered that the foregoing thermoplastic resin can be bonded to its metallic substrate or core in a uniform thickness at high speeds in a continuous manner by means of a hot melt polyamide resinous adhesive composition; the process employing the heat absorbing qualities of the metallic substrate to cool the hot-melt adhesives for effective bonding at the linear speeds prescribed therein. dr

DESCRIPTION OF THE PREFERRED EMBODIMENTS

The novel product of the present invention comprises generally a protectively coated metallic substrate and an extrudable thermoplastic resin coating bonded thereto by means of a hot melt resinous polyamide adhesive composition.

Figure 1:
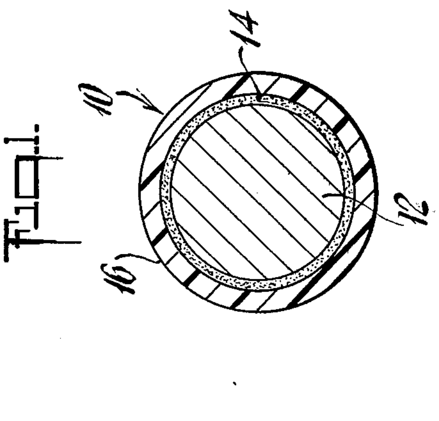
FIG. 1 is a cross-sectional view of the laminated product prepared according to the present invention.

The metallic substrate treated according to the practice of this invention may vary substantially as to conformation, flexibility and the metal employed. Illustratively, the process herein described has application to relatively smooth metallic surfaces such as copper, aluminum and aluminum-containing metals including aluminum alloys, brass, magnesium, steel, whether galvanized, ungalvanized, bethanized, aluminum coated or high strength, low alloy steels in which the alloy is, for example, chromium, silicon, copper, nickel, phosphorus alloy (sold by the U.S. Steel Corporation under the trade name COR-TEN A steel) or a manganese, chromium, vanadium alloy (sold by U.S. Steel Corporation as COR-TEN B steel), or steel surface-treaed with phosphoric acid for example; and whether in the form of tubing, H-beams, web constructions, flat plate, cable, filament or wire strands, and the like. The invention herein described has particular and unique application, however, to wire having most desirably a smooth, nodule-free surface as shown in FIG. 1, and that paid out at high speeds from a coil which, after coating is completed, may be conveniently reformed as a coil.

The preferred substrate is galvanized wire suitable for use in the manufacture of chain-link fence wherein the wire substrate is produced, according to processes well known to those skilled in the art, from hot-rolled rods of controlled quality steel. The rods are cold drawn through dies to reduce the diameter of the rod while increasing its length. The cold drawing contributes desirable properties of higher tensile strength and increased stiffness. The resulting wire is then conventionally heat dip galvanized using slab zinc.

While the dimensions of the substrate to be coated are not narrowly critical, where wire is, for example, being coated, preferred limits have been found where, illustratively, the wire is to be used in making chain-link fence having a cross-sectional diameter within the range of about 0.076 inch to about 0.192 inch. Indeed, the invention is especially practicable for use with normally rigid wire of this diameter and having, in addition, a tensile strength of 65,000 to 120,000 psi.

The vinyl resins forming the protective coating are commercially available vinyl halide, and particularly vinyl chloride, homopolymers, as well as copolymers containing at least 70 percent by weight of vinyl chloride and up to about 30 percent by weight of one or more other polymerized comonomers. Illustrative of the vinyl comonomers for use in the foregoing copolymers are vinyl esters of the following general formula:

$$CH_2{=}CH{-}O{-}\overset{\displaystyle O}{\overset{\|}{C}}{-}R \qquad (I)$$

wherein R is a lower alkyl moiety and one preferably of from 1 to 4 carbon atoms. Illustrative of the comonomers are vinyl acetate, vinyl butyrate and vinyl propionate.

The vinyl resins thus employed in the practice of this invention provide the most significantly effective bond according to the practice, and under the conditions, achieved hereunder in combination, by way of illustration, with with excellent protective properties including resistance to abrasion, weathering, oxidation and attack by a variety of other chemicals while being relatively inexpensive and easily handled.

Other significantly less preferred extrudable thermoplastic resins which may also be used, however, in the practice herein described include the polyolefins, notably low density polyethylenes and most desirably those having a low melt index of from about 0.2 to 0.4 as measured by ASTM Procedure D-1238-65T; and polyamides, such as nylon-6 and nylon-12, which are pigmented and stabilized for long outdoor exposure.

The foregoing vinyl chloride homopolymers and copolymers are combined with plasticizer and preferably mixtures thereof, in an amount by weight of about 25 to about 40, and preferably about 28 to 32, parts for every 100 parts of resin (phr). Included among these plasticizers are liquid plasticizers among which are the alkyl and alkoxy alkyl esters of dicarboxylic acids or the esters of a polyhydric alcohol and a monobasic acid; and more specifically, phthalate plasticizers, such as dioctyl phthalate, butyl octyl phthalate, di-2-ethylhexyl phthalate, di-isodecyl phthalate, N-octyl phthalate, dinonyl phthalate, diisooctyl phthalate, butyl lauryl phthalate, butyl benzyl phthalate, and ethyl phthalylethyl glycolate; dibasic acid ester derivatives such as dioctyl adipate, dioctyl azelate, dioctyl sebacate, dibutyl sebacate and glyceryl stearate. Also contemplated as plasticizers are phosphates such as trioctyl phosphate, triphenyl phosphate and tricresyl phosphate; as well as chlorinated fatty acid esters, alkyl epoxy stearates, epoxides of soya bean oil fatty acid, and epoxy linseed oil.

A wide variety of plasticizers can be employed in the vinyl polymer by virtue of the particular adhesives employed herein which are substantially insoluble in the commonly employed vinyl resin plasticizers.

Other conventional components include stabilizers and pigments, normally from about 1 to 9 phr., and preferably about 3.5 to 5 phr. thereof. These components are well known within the field and commercially available. The stabilizers employed particularly are thermal and light stabilizers, such as, illustratively, benzophenone and benzotriazole derivatives usually in an amount by weight of about 0.05 to 0.3 phr., and dibasic lead phosphite or cadmium and zinc salts in an amount by weight of about 0.05 to 0.3 phr. Pigments, employed in amount of 0.0001 to 3.0 phr., are also well known and include, for example, phthalocyanine green, phthalocyanine blue, carbon black and titanium dioxide.

The resulting plasticized polyvinyl chloride resin compositions contain most desirably, no fillers, extenders or other extraneous matter. The colors or pigments are stabilized with conventional stabilizers as aforesaid, have a light fastness that shall withstand a minimum Weather-O-Meter exposure of 4000 and up to 5000 hours without any deterioration (Test equipment operating Light and Water Exposure Apparatus Carbon-Arc Type) ASTM D 1499, E 42 Type and 649 as applied to wire and pipe coating respectively. The extrusion grade semi-rigid vinyl resin utilized will have most have desirably a maximum specific gravity of 1.30 to 1.32 (ASTM D 792); a hardness of about Durometer A 75 to 95, Shore A durometer and preferably about 90 to 95; a tensile strength of about 1500 and 3500 (pounds per square inch guage) psig and about 270 to 280 percent elongation (ASTM D 412). This protective vinyl resin is characterized by high abrasion resistance, maximum deformation of 15% at 120° C. (Underwriter Laboratories Test Procedure) under a 500 gram load and compression cut through of 1500 psig to 1800 psig and preferably 1700 to 1800 psig (Bell Laboratory Test Procedure).

The vinyl chloride resin coating thus formulated can be applied to the metallic core or wire under the conditions recited herein including exceptionally high speed with uniformity, from a conventional extruder in effective thicknesses to achieve a protectively coated wire having all of the desired properties necessary for imparting an extended useful life to the product of the invention under vigorous conditions to which, for example, chain-link fence, as well as other products formed of the insulated and protected metallic substrates produced according to the invention, are subjected.

The hot melt polyamide adhesive compositions employed in the practice herein described are high molecular weight polymeric polyamide compositions thermally stable as melts in the Brookfield melt viscosity ranges recited hereinbelow and produced preferably and substantially from polymeric fatty acids and one or more and preferably a mixture of non-aromatic diamines, and at least in excess of fifty percent by weight of the total amine employed of alkylene diamines having from about 2 to 20, or more desirably 18, carbon atoms and preferably 2 to 6 carbon atoms. Illustrative non-aromatic diamines employed, in admixture with the major portion of alkylene diamines recited are 1,4-diaminocyclohexane, ethylene-1,2-bis (4-piperidine) and piperazine. The foregoing polyamides can include desirably, and in addition an aliphatic or cycloaliphatic saturated or unsaturated dicarboxylic acid or mixtures thereof containing from about 6 to 36 carbon atoms; illustratively sebacic acid, adipic acid and 1, 10-decanedioic acid, and the isomers of 1, 4-cyclohexanedicarboylic acid. The proportion of these dicarboxylic acids incorporated in the polyamides of the instant invention are not permitted normally to exceed 30 weight percent of the total acid content incorporated in the polyamide adhesives utilized herein.

The significantly preferred polymeric fatty acids employed in this invention are fractionated polymeric fatty acids having in excess of about 90 percent by weight of the total fat acid present incorporated in the form of the dimer acid. The remaining 10 weight percent is composed substantially of monomeric acid and some higher polymeric forms. Significantly preferred fatty or fat acids for use in the practice herein defined are ethylenically unsaturated monobasic aliphatic acids, containing from preferably about 10 to 24 carbon atoms, and most desirably 16 to 20 carbon atoms. Of these the most preferred is linoleic acid and oleic acid. Mixtures of these acids are found in tall oil fatty acids, mixtures which provide a convenient source for preparation of the polymeric fatty acids employed herein.

Illustrative compositions (on a weight percent basis) of comercially available polymeric fatty acids, based on unsaturated $C_{18}$ tall oil fatty acids that are subject to fractionation before use in forming the polyamide employed in the practice of the invention are:

$C_{18}$ monobasic acids ("monomer") 5–15%
$C_{36}$ dibasic acids ("dimer") 60–80%
$C_{54}$ (and higher) ("trimer") 10–35%

These acids are reacted, in the formation of the polyamides employed herein, either as the acid per se or as an equivalent derivative capable of forming amides in a reaction with a diamine, such as the lower alkyl alcohol esters, wherein the alkyl moiety contains from about 1 to 8 carbon atoms, of polymeric fatty acids.

The fatty acid or derivative is fractionated by, for example, conventional distillation or solvent extraction methods. They may optionally be partially hydrogenated to reduce unsaturation using hydrogen pressure in the presence of a hydrogenation catalyst in accordance with methods well known to those skilled in the art to which this invention pertains.

The term "fatty acid" or "fat acid" is intended to encompass monobasic aliphatic acids. The terms "monomer" or "monomeric fatty acid," "dimer" or "dimeric fatty acid," and "trimer" or "trimeric fatty acid" or equivalent terms, are intended to describe the unpolymerized monomeric fatty acids or derivatives present in the polymeric fatty acids; the dimeric fatty acids or derivatives (formed by the dimerization of two fatty acid molecules); and the residual higher polymeric forms composed primarily of trimeric acids or derivatives, but containing usually some higher polymeric forms, respectively.

For the purposes of this invention, monomeric, dimeric and trimeric fat acid contents are defined further by a micromolecular distillation analytical method. The method is that of Paschke, R. E., et al., J. Am. Oil Chem. Soc. XXXI (No. 1) 5, (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is based on the residue.

The alkylene diamines employed herein in combination with the foregoing fatty acids are preferably alkylene diamines having from 2 to 16 carbon atoms. These diamines are further defined by the formula:

$$H_2N(CH_2)_xNH_2$$

wherein x is an integer of from 2 to 20, and preferably 2 to 6 carbon atoms. Illustrated and preferred of these diamines is ethylene diamine and 1, 6-diaminohexane. Further illustrative of these diamines are 1,3-diamino butane, 1,4-diamino butane, and, although less preferred, 1,8-diaminooctane, 1,10-diaminodecane, 1,9-diaminononane, 1,12-diaminododecane and 1,18-diaminooctadecane.

The polyamide compositions employed in the practice of the invention are prepared by reaction of one molar equivalent of amine with one molar equivalent of carboxyl group present. The time and temperature of the reaction of diamine and fractionated fatty acid, other acid or acid derivative are not narrowly critical but are normally within the range of from 150° Centigrate (C.) to 300° C. for a period of from one-half hour to 8 hours; the longer period being employed at the lower temperatures.

The polyamide resins for use herein are those effecting a superior bond with the metallic substrate and thermoplastic resinous coating at the temperatures and within the other operating parameters described hereinbelow.

Thus, in order that the resins be readily applied preferably as a liquid and in a thickness necessary for effective bonding of the resin coat and metallic substrate thereby at the high rates of speed defined herein, it is significantly preferred that they manifest a softening point of from about 112° Centigrade (C.) to 138° C. (233° Fahrenheit (F.) to 280° F.), and preferably 135° C. to 138° C.; a Brookfield melt viscosity of 10 to 100 poises, and preferably 40 to 60 poises, at 210° C.; a tensile strength of from about 400 pounds per square inch (psi) to 500 psi and preferably about 450 psi and a percentage (%) elongation of from 400 to 600, and preferably about 550.

The softening point referred to hereinabove is the ball and ring softening point as measured by ASTM E28-59T.

The tensile strength and elongation are measured on an Instron Tensile Tester Model TTC using ASTM 1708-59T.

The polymer is compression molded as a 6"×6" sheet of approximately 0.04 inches thickness, at a temperature near its melting point (usually a few degrees lower than the melting point) and at 40,000 lbs. load or higher using cellophane as the parting agent in the mold. From this sheet, test specimens are die-cut to conform to ASTM 1708-59T.

Test specimen is clamped in the jaws of the Instron. Crosshead speed is usually 0.5 inch/minute at 100 lbs. full scale load. Chart speed is 0.5 inch/minute. Tensile strength (reference: ASTM D-638-52T) is calculated as:

$$\text{Tensile strength} = \frac{\text{maximum load in pounds}}{\text{cross sectional area (sq.inc.)}}$$

Percent elongation is calculated as:

$$\%\ \text{Elongation} = \frac{\text{gage length at break minus gage length at 0 load} \times 10}{\text{gage length at 0 load}}$$

The polyamides employed herein may be, and are preferably, used as such, or may have incorporated therewith conventional additives well known to those skilled in the art, notably inert inorganic fillers such as calcium carbonate, in amounts, for example, up to 40 percent by weight of the adhesive composition, and standard plasticizers such as ortho and para toluene ethyl sulfonamide. These plasticizers are employed, illustratively, in amounts of up to 5, and preferably up to 3, percent by weight of the total adhesive compositions. The incorporation of fillers and plasticizers, although economically efficacious, tends to lead to a less effective bond.

Other polyamides, including copolyamides suitable for use in the practice of the invention are disclosed in U.S. Pat. Nos. 3,454,412; 3,398,164; 3,377,303; and 3,449,273 together with the additives recited therein and provided, with respect to the significantly preferred polyamides coming within the disclosure of these patents, that they manifest softening points, melt viscosities, tensile strengths, and percentages of elongation, coming within the ranges recited hereinabove. In addition, those polyamides containing substantial amounts of tertiary amine moieties or other base-forming groups tend to be significantly less preferred in the practice herein described since they are prone, when heated, to cause decomposition of contiguously disposed resin.

The products of the invention and the process by which they are prepared are further illustrated by detailed reference to the accompanying drawing wherein the preferred embodiment of the invention is manifested. Thus, there is shown in FIG. 1 the coated and bonded wire 10 incorporating the metallic substrate 12 preferably formed of galvanized steel, and surrounding this substrate, a continuous ply of hot melt polyamide adhesive 14 as characterized hereinabove and to which is bonded in turn as the exterior ply, a coating, most desirably, of a vinyl halide resin composition 16.

Figure 2:
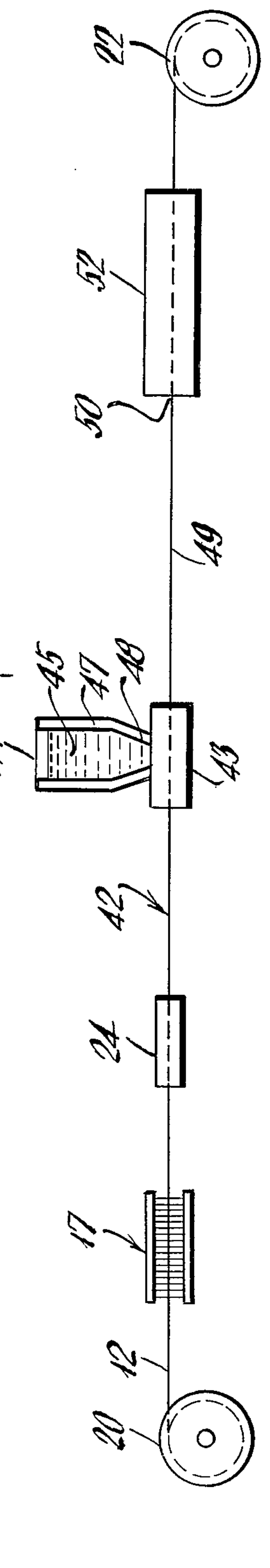
FIG. 2 is a semi-diagrammatic illustration of the method employed according to the invention in producing the product of FIG. 1.

The composite wire product 10 of FIG. 1 is prepared in accordance with a preferred embodiment of the invention as shown in FIG. 2 wherein standard equipment well known to those skilled in the art is employed, except where otherwise expressly indicated. Thus, a continuous metallic wire core 12 is drawn at speeds of up to about 2000 feet per minute through a plurality of treatment zones in which it receives successive resinous plies (designated by the numerals 14 and 16 in FIG. 1) and is subjected to several significant variations in temperature.

More particularly, according to this process a coil of untreated wire 12 is uncoiled from a supply stand or pay-off frame 20 which may be of standard design and drawn through successive treatment zones at a line rate of speed of between about B 200 to approximately 2000 feet per minute and preferably within the range of about 800 to about 1500 feet per minute.

Indeed, in a preferred embodiment, the bond between the galvanized steel wire 12 and the extruded vinyl coating 16 provided by the hot melt adhesive 14 is improved with increased line speed as is the esthetic appeal of the coated product as reflected in the high surface gloss achieved at these increased rates of speed, thus enhancing the useful life and desirable appearance of the product while decreasing its cost of manufacture. While not intended to be limited to any particular theory of operation, it is believed that this phenomenon is attained by virtue of the increased activation afforded the adhesive when it comes into contact with the extruded vinyl resin which at the higher rates of line transmission will be extruded onto the wire more rapidly and at higher temperatures within the ranges recited in accordance with the invention.

The initially uncoiled wire is, in any event, first cleaned by standard physical means such as brushes or cloth 17, or alternatively by conventional chemical reagents to remove dust, oil or other foreign substances from the substrate or core 12. In a preferred embodiment of this invention a lightly oxidized layer of zinc and, most desirably, a substantially monomolecular layer thereof, is present on the wire surface after cleaning is complete. This oxidized surface includes normally oxides as well as hydroxides, of zinc which adhere to the wire surface assiduously through the cleaning operation and result in enhanced adhesion of the polyamide resin adhesive composition thereto. The surface of the wire may, optionally, be roughened by mechanical means to enhance, perhaps, adhesion of the polyamide, but it is neither essential nor, indeed, particularly desirable to do so. After the cleaning step is completed the wire is transmitted through a first treatment zone 24 comprising, in a preferred embodiment, the device of FIG. 3, an insulated heated dipping tank 27 preferably of rigid double wall contruction, containing an entry orifice 28 with a suitable entry die (not shown) through which the wire 12 is advanced into the tank 27 thus preventing leakage of adhesive present in the molten state within the tank 27 from about the advancing wire 12. Heating elements (not shown) are disposed within or about the walls of the tank in standard manner to secure the elevated temperatures required to melt the normally solid adhesive and achieve the temperature necessary to effective coating of the wire 12. Positioned at the level of the entry orifice 28, but in the wall opposite that 29 in which the entry orifice 28 is defined, is an exit orifice 31 comprising a sizing die of the requisite diameter to provide the desired thickness of adhesive coating 14 on the wire core 12 leaving the first treatment zone. The dipping tank 27 is preferred particularly because the viscosity of the adhesive may vary within a broader range than where other applicator means are used. Indeed, the use of the dipping tank is essential to attain rates of speed and uninterrupted operation within the preferred limits recited hereinabove. Illustrative alternatives are however available for use at significantly reduced speeds as, for example, that shown in FIG. 4, wherein the wire core 12 may be transmitted through a cross-head applicator 32 that constitutes the first treatment zone 24. The fluid adhesive, normally solid at ambient or room temperatures, is pumped into the applicator at an elevated temperature sufficient to render it a molten plastic or through the feed screw of a conventional extruder apparatus into the foregoing cross-head applicator or die 32. The adhesive is heated in part by the frictional or shearing forces exerted by kneading of the resinous adhesive in the barrel of a conventional extruder and more particularly by heating means disposed in conventional manner in a jacket mounted about the feed screw barrel or other passage or mixing chamber through which the adhesive is conveyed to the applicator head. A commercially available hot melt applicator is that designated by the trade name Spraymation and particularly that bearing the grade designation 84300 manufactured by Spraymation, Inc., Little Falls, New Jersey used to supply adhesive to a cross-head applicator or die 32. The applicator 32 comprises a die body 33, having an annular passage 34 flared at its opposite ends 35 and 36 and adapted to receive in threaded engagement therewith threaded dies 37 and 38 having axially disposed orifices, the entry orifice 39 and the exit orifice 40 respectively, of uniform cross-sectional diameter. The first of these orifices 39 defines the point of entry of the wire 12 into the first treatment zone formed by the annular passage or reservoir 34 and has a larger cross-sectional diameter than the exit orifice 40 which forms a sizing die controlling the thickness of the adhesive coating applied to the wire 12 in the initial treatment zone. Intermediate the opposite ends 35 and 36 of the passage 34 there is disposed an entry port 41 through which the adhesive however fed thereto is transmitted into the passage which thus serves as a reservoir in which the molten adhesive is applied to the advancing wire.

Figure 4:
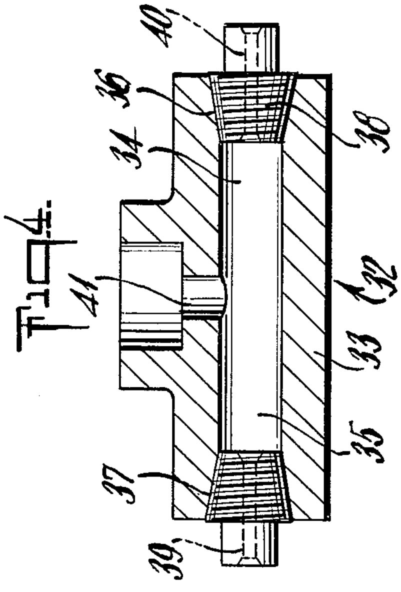
FIG. 4 is a sectional view of an alternative apparatus for use in the practice of the invention.

Whichever of the foregoing means of application is used, however, the temperature to which the normally solid adhesive is elevated to induce the necessary viscosity and resulting adhesion to the metal substrate is normally from about 300° F. to about 450° F. and preferably about 350° F. to about 450° F., the temperatures varying with the particular composition of the adhesive formulation, and the thickness of the adhesive coating 14 to be formed. The preferred range is employed particularly where the limitations on viscosity of the adhesive are more severe, that is, for example, where the cross-head applicator of FIG. 4 is utilized. Within the preferred parameters for practice of the present invention as defined herein, the temperature of the adhesive composition when applied in the first treatment zone is about 350° F. to about 450° F. to effect the continuous uniform coating required. The thickness of the coating is normally within the range of about 0.25 mils (0.00025 inch) to about 5 mils (0.005 inch) and preferably about 2 mils (0.002 inch).

Upon leaving the first treatment zone 24 the adhesive coated wire passes in a substantially linear manner through the ambient atmosphere, which is maintained normally at approximately 65° F. to 78° F., and constitutes a second treatment zone 42, in which the adhesive is returned to its substantially solid state. This zone has a length normally of about 2 to 20 feet for a residence time of about 0.06 second to 6 sec. and preferably about 4 feet to about 8 feet a residence time of about 0.16 to 0.6 sec. The most desirable cooling to enable the adhesive to assume the flexible, soft but solid and resistant to flow properties best adapted for effective entry into and activation of the adhesive 14 deposited about the wire 12 in the third treatment zone is generally about 6 feet or a residence time of about 0.24 to 0.45 sec. The ambient air provides the cooling medium of the second treatment zone, together, significantly it has been found with the metallic core 12 which functions as a heat sink for the elevated temperatures imparted to the adhesive in the first treatment zone.

The second treatment zone or cooling span 42 terminates in the third or vinyl resin deposition zone 43. This zone is composed of the annular passage defined by a cross-head die, also designated in this embodiment by the numeral 43. The passage through which the wire is transmitted in this zone may, illustratively, be smooth bore of uniform diameter or tapered to a relatively constricted diameter intermediate the opposite ends of the passage. The method involved is well known to those skilled in the art. The extrusion process involves, by way of illustration, blending vinyl halide resin in the form of a fine powder with plasticizer and other additives to form pellets, usually. This thermoplastic resin composition is then fed through a hopper (not shown) into one end of a conventional plastic extruder from which the plastic is then fed onto a standard screw 45 mounted in the circular passage or barrel 47 with a close clearance between barrel and screw surface of, for example, 0.001 inch per inch of screw diameter. The screw 45 is drawn by a variable speed motor (not shown) which is capable normally of inducing a screw speed of 30 to 100 revolutions per minute (rpm). The barrel 47 is usually heated electrically and together with the heat resulting from the shearing of the pelletized vinyl resin composition advanced through the barrel 47 from the hopper by the screw 45 attains a molten state as it approaches the extruder head composed of the constricted passage of the adaptor 48 and cross-head die 43. The faster the line speed of the wire to be coated, the faster the speed of screw rotation and the higher the shearing temperature effected within the barrel 47. Consequently, the higher the temperature of the resin composition as it enters the cross-head die 43 and the more effective the bond achieved between the adhesive and vinyl coating. The temperature induced in the barrel 47 of the screw feed is sufficient to activate the hot melt adhesive advancing into the cross-head die from the second treatment zone, where the adhesive has been cooled and rendered sufficiently solid to pass unimpeded into the cross-head die without clogging of the latter at and about the point of entry of the adhesive-coated wire into the die.

The temperature attained in the extruder head or die of the third treatment zone is from about 300° F. to about 425° F. and preferably about 350° F. to about 400° F.; temperatures sufficient to secure an effective bond between the vinyl coating and the wire 12 without degradation of the adhesive or vinyl resin composition.

The coating applied in the cross-head die of the extruder is most desirably about 0.015 inch to about 0.025 inch in thickness where the product wire is to be woven into chain-link fence fabric.

The coated wire product 10 is then advanced into the final treatment zone 49 prior to being rewound on the take-up reel 22 driven by conventional electric motor or other drive means (not shown).

The final treatment zone comprises an intermediate air space or heat transfer zone 50 of about 2 to 20 feet or more in length and preferably about 5 to 15 feet, and a cooling bath or trough 52 through which cold water is circulated. The further removed from the cross-head die 43, the water-containing cooling bath 52 is positioned within the recited parameters, the better the bonding of the vinyl resin coating 16 secured to the metallic substrate or core 12, since greater opportunity is given for activation of the adhesive 14 and a consequently improved bond. The residence time in the heat transfer zone 50 will vary within the range of from about 0.08 second (sec.) to 6 sec. with a preferred range of about 0.2 sec. to 1.2 sec.

The cooling bath 52, containing desirably a circulating stream of water operating at a temperature within the range most desirably of 50° F. to 70° F., serves to assure solidification of the adhesive and vinyl resin plies 14 and 16 respectively, so that the product 10 can be recoiled or otherwise stored or used after leaving the bath 52. The residence time within the bath is not narrowly critical. A minimum period of time is normally about 0.05 minute.

The resinous adhesives thus evolved are characterized by excellent adhesion to the vinyl resins and metallic substrates at the temperatures and within the other parameters set forth herein.

The coated wire combines, as will be evident from the accompanying description, means for producing a product of unusually desirable characteristics in a significantly efficient and inexpensive manner.

The following examples are further illustrative of the invention. In the examples all parts and percentages are by weight unless otherwise expressly indicated.

EXAMPLE 1

This example illustrates the production of wire having a protective coating bonded thereto in accordance with the invention.

Figure 3:
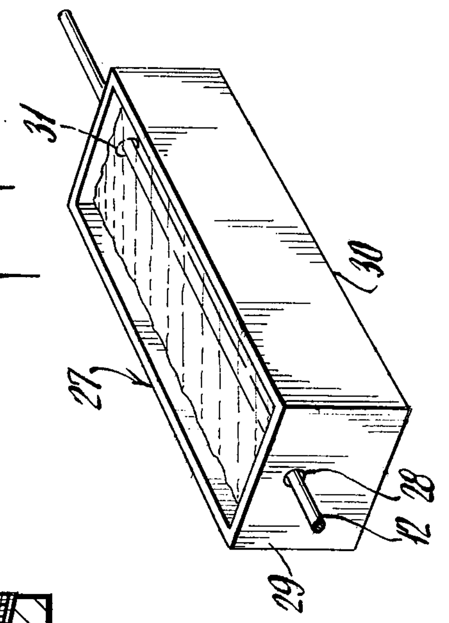
FIG. 3 is a perspective view of apparatus used in the practice of the process according to the invention.

A continuous substrate of galvanized steel wire 12 having a cross-sectional diameter of 0.106 inch and a tensile strength of 100,000 psig is advanced at a rate of 250 feet per minute through mechanical cleaning means 17 and thence through the cross-head die of a dip tank hot melt resin applicator such as described herein-above and illustrated in FIG. 3 wherein the sizing die through which the adhesive coated wire is advanced into the second treatment zone has a dimension identical to that of the exit orifice therein and in which a temperature of 390° F. is maintained and wherein a polyamide hot melt adhesive composition in the molten state and having a temperature of 390° F. is applied to the wire or filament 12 in a thickness of about 0.002 inch.

The normally solid hot melt adhesive is a thermoplastic polyamide resin prepared by charging fractionated polymerized tall oil fatty acids manifesting the following properties upon analysis:

| | |
|---|---|
| Saponification Equivalent: | 285 |
| Neutralization Equivalent | 290 |
| Monomer | 1.1 |
| Dimer | 98.2 |
| Trimer (and higher polybasic acid residue) | 0.7 |

together with a mixture of diamines including ethylene diamine and hexamethylene diamine into a reactor equipped with a stirrer, thermocouple and distillation head. One molar equivalent of amine is charged to the reactor for each mole of carboxyl there introduced. The reaction mixture is stirred successively for 1.25 hours at 36° C. (96.8° F.) to 160° C. (320° F.); 0.75 hour at 160° C. (320° F.); 0.5 hour at 160° C. (320° F.) to 250° C. (482° F.); 0.5 hour at 250° C.; and then under vacuum for 2.25 hours at 250° C. The adhesive is characterized by a ball and ring softening point of 138° C.; a tensile strength of 450 psi and a percent elongation of 550.

From the exit orifice die of the dip tank (27 of FIG. 3) termed the first treatment zone, the wire is advanced in a substantially linear manner through the ambient atmosphere constituting the second treatment zone 40 having a length of about 40 feet, in which the adhesive coated wire is permitted to cool and solidify. The coated wire is then delivered to the third treatment zone 42 formed by the smooth annular bore of a cross-head die into which molten vinyl chloride resin composition Colorite 9813 Black, a plasticized poly (vinyl chloride) containing low temperature (−20° C.) plasticizer, a mixture of thermal and ultra-violet stabilizers and pigment with no other fillers, extenders or other extraneous matter present, is fed from a conventional screw feed extruder 43.

The vinyl chloride resin composition feed has a light fastness sufficient to withstand (1) a minimum Weather-O-Meter exposure of 4000 hours without deterioration (Test Equipment Operating Light and Water Exposure Apparatus Carbon-Arc Type) ASTM D 1499, E 42 Type E, and (2) an accelerated aging test of 2000 hours at 145° F. without cracking or peeling. The resin has, in addition, a tensile strength of 2700 psi, ultimate elongation of 275%; a specific gravity of 1.30 maximum, a hardness not less than Durometer A 90±5: maximum deformation of 15% at 120° C. under a 500 gram load and a compression cut through of 1500 psi; when measured by the appropriate test procedures recited in the description appearing hereinabove. The screw is rotated in the heated extruder barrel at a rate sufficient to knead the foregoing resin and exert a shearing force adequate, in turn, to induce a temperature in the plasticized resin being advanced in the barrel 45 and the extruder head or die 42 to about 350° F.

The cross-sectional diameter of the die is sufficient to provide a resin coating of 0.020 inch and define an outside diameter of about 0.146 inch to the product wire 10 when the coating operation is complete.

The wire is next passed into the final treatment zone 49 including a cooling trough 52 in which water is circulated. This trough is removed from the die 43 by about fifteen feet in which span the coated wire travels in a linear path through a room temperature atmosphere. In this span the vinyl resin coating and hot melt adhesive perfect the bond initiated in the vinyl extruder's cross-head die and is cooled sufficiently to avoid accumulation of coating resin on the guide rolls of the trough. The coated wire is then advanced through the trough or dam 52 which is maintained at about 69° F. to 75° F. and the finished product recovered therefrom after a residence time of about 2.5 seconds. This product evidences good adhesion five minutes after its recovery from the final treatment zone and may be stripped from the wire substrate only with difficulty.

EXAMPLE 2

This example illustrates the use of an increased line speed in the practice of the invention.

The procedure of Example 1 is repeated using a line rate of speed in the various treatment zones of 600 feet per minute. The plasticized vinyl resin at the point of application in the cross-head die achieves a temperature of about 390° F. The surface finish is found improved to a glossy condition over that of Example 1. Adhesion of the vinyl coating is found improved over that secured in the product of Example 1.

EXAMPLE 3

This example illustrates the use of a line rate of speed significantly faster than that of Examples 1 and 2.

The procedure of Example 1 is repeated using a line rate of speed in the several treatment zones of about 900 feet per minute. The vinyl resin has a temperature of about 370° F. in the cross-head die. The surface gloss and adhesion were substantially improved over those secured at the lower rates of speed of Examples 1 and 2. The degree of surface gloss secured is significant in that the vinyl resin coating effected is important not only for its protective character but for its esthetic appeal as well, particularly where it is to be employed in the manufacture of chain-link fence.

EXAMPLE 4

This example illustrates the use of a line speed significantly faster than that of the prior examples.

The procedure of Example 1 is repeated using a line rate of speed in the several treatment zones of about 1000 feet per minute. The surface gloss is excellent, and the adhesion to the wire substrate of the vinyl resin coating as good as that secured in Example 3. The outside diameter of the product wire secured under conditions otherwise identical to those recited in Examples 1 to 4 was 0.148 inch, with a vinyl coat of 0.022 inch thickness. The speed of the coating operation is limited by the take-up capability of the apparatus used; not by the effectiveness or speed of application.

EXAMPLE 5

This example illustrates the use of a cross-head die of different construction for application to the wire substrate to the hot melt adhesive.

The procedure of Example 1 is repeated using a line rate of speed of about 500 feet per minute and employing a Spraymation applicator 84300 described hereinabove with the cross-head applicator of FIG. 4 affixed to the outlet end thereof and the entry orifice 39 of the cross-head applicator has a uniform cross-sectional diameter of 0.110 inch to provide a uniform coating of hot melt adhesive of 0.002 inch in the bare wire having a diameter of 0.106 inch.

EXAMPLE 6

This example illustrates the practice of the invention as described in Example 1 employing variable conditions coming there within.

The procedure of Example 1 was employed using a line rate of speed of about 975 feet per minute. The cross-sectional diameter of the wire, the slab zinc surface of which is lightly oxidized and otherwise brush cleaned, is 0.106 inch. The temperature of the dip tank along the path of adhesive application was 400° F. The adhesive was a polyamide of the type, and the preparation of which is, described in Example 1; characterized by a ball and ring softening point of about 138° C.; a Brookfield melt viscosity at 210° C. of about 45 poises; a polymer tensile strength of about 450 psi; and a percent elongation of about 550. The adhesive is deposited on the wire substrate in a thickness of 2 mils. The vinyl resin, identical to that of Example 1 is deposited in the manner therein described, in a thickness of about 20 mils to provide a coated product wire with an outside diameter of about 0.105 inch. The adhesive and vinyl resin coatings deposited are substantially uniform in thickness. The product wire manifested a peel strength of about 65 pounds (to strip).

EXAMPLE 7

This example illustrates the practice of the invention as applied to different metallic wire substrate than that employed in the prior examples.

The procedure of Example 6 was repeated substituting an aluminum alloy wire substrate having a cross-sectional diameter of 0.120 inch chemically cleaned to remove oil and other foreign substances from its surface. The adhesive was applied at a temperature of 400° F. in a thickness of about 2 mils to the wire which advanced through the various treatment zones at a rate of 400 feet per minute. The identical plasticized vinyl chloride resin composition of Example 6 was extruded into the resulting adhesive coat in the manner of Example 6 in a thickness of 13 to 14 mils to provide a finished coated wire having an outside or cross-sectional diameter of 0.150 inch. The peel strength of this product was found to be excellent.

The determination of the extent of bonding of vinyl resin coating to the metal substrate described as peel strength where referred to in the foregoing examples is made using a six inch length of specimen wire which is suspended vertically from the grips of a tensile tester. The upper five inches of this wire sample are stripped of thermoplastic resin coating. The other extremity of the wire that is stripped is positioned within the annular orifice or band of adjustable diameter of a steel stripping fixture adapted to receive the wire. The stripping fixture is, itself, mounted in the lower grips of the foregoing tensile tester. The diameter of the orifice is adapted to receive the stripped wire but not the coated portion of the wire which is one inch in length and abuts the lower end of the stripping fixture. The stripping fixture or device is, in performance of the test, lowered under pressure to effect peeling of the bonded resinous coating from the wire substrate. The maximum tensile load or weight necessary to strip the wire, characterized as break-down force, is recorded on a load cell of the tensile tester.

Various epoxy and acrylic adhesives and zinc chromate primers employed under conditions similar to those recited above evidence normally either slight or no adhesion. Where any adhesion is secured the bond is brittle. Other acrylic resin adhesives such as that sold by Hughson Chemical Company in a two component system under the trade name designation Hughson 521 accelerator #3 (lacquer) modified acrylic adhesive system, exhibited good adhesion but required that the system be run at a very reduced line rate of speed.

It will be evident that the terms and expressions which have been employed are used as terms of description and not of limitation. There is no intention in the use of such terms and expressions of excluding equivalents of the features shown and described or portions thereof and it is recognized that various modifications are possible within the scope of the invention claimed.

What is claimed is:

1. A protectively coated wire comprising a metallic wire substrate and bonded to said substrate a polyamide resin hot melt adhesive, said polyamide hot melt adhesive comprising the condensation product of alkylene diamines of the formula:

$$H_2N(CH_2)_xNH_2,$$

wherein x is an integer of from 2 to 20; and polymeric fat acids having a dimeric fat acid content greater than about 90 percent by weight; the molar equivalent of amine employed being about equal to the molar equivalent of carboxyl groups present in said fat acid; said condensation product having a softening point of 112° C. to 138° C. and a tensile strength of from 400 pounds per square foot to 600 pounds per square foot; and a second ply in a thickness of at least 0.015 inch of an extrudable thermoplastic resin adhering to said substrate by means of said adhesive.

2. A protectively coated wire as claimed in claim 1, wherein said extrudable thermoplastic resin is a plasticized vinyl resin.

3. A protectively coated wire as claimed in claim 1, wherein said plasticized vinyl resin is present in a thickness of at least 0.015 inch to 0.025 inch.

4. A protectively coated wire as claimed in claim 2, wherein said vinyl resin is a plasticized polyvinyl chloride comprising 100 parts by weight of vinyl chloride homopolymer and from 25 parts to 40 parts of a plasticizer per hundred parts of homopolymer.

5. A protectively coated wire as claimed in claim 4, wherein said plasticizer is non-migratory with respect to said hot melt adhesive.

6. A protectively coated wire as claimed in claim 2, wherein said vinyl resin is plasticized vinyl chloride homopolymer.

7. A protectively coated wire in accordance with claim 2, wherein said vinyl resin is a copolymer of not less than seventy percent by weight of polymerized vinyl chloride and not more than thirty percent by weight of a vinyl ester of the general formula:

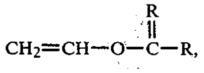

wherein R is a lower alkyl radical.

8. A protectively coated wire as claimed in claim 1, wherein the diamines of said polyamide resin hot melt adhesive coming within the formula therein recited include those in which x is an integer of from 2 to 6 and said polyamide resin has a melt viscosity of 10 to 100 poises at 210° C.; and a percentage elongation of from 400 to 600.

9. A protectively coated wire as claimed in claim 8, wherein said polyamide has a Brookfield melt viscosity of 40 to 60 poises at 210° C.

10. A protectively coated wire as claimed in claim 1, wherein said substrate is galvanized steel wire; said polyamide adhesive has a softening point of from about 135° C. to 138° C.; a Brookfield melt viscosity of about 45 at 210° C.; a tensile strength of about 500 pounds per square inch; and a percent elongation of about 550.

11. A protectively coated metallic wire substrate as claimed in claim 10, wherein said substrate is galvanized steel wire including a lightly oxidized slab zinc surface coating.

12. A protectively coated wire as claimed in claim 1, wherein said substrate is galvanized steel wire.

13. A protectively coated wire as claimed in claim 1, wherein said substrate is aluminum-coated steel.

14. A protectively coated wire as claimed in claim 1, wherein said substrate is bethanized steel.

15. A protectively coated wire as claimed in claim 1, wherein said substrate is a steel alloy in which the alloying components are chromium, silicon, copper, nickel and phosphorus.

16. A protectively coated wire as claimed in claim 1, wherein said substrate is a steel alloy in which the alloying elements are manganese, chromium and vanadium.

17. A protectively coated wire as claimed in claim 1, wherein said substrate is an aluminum-containing metallic material.

18. A protectively coated wire as claimed in claim 1, wherein said substrate is galvanized steel wire having a cross-sectional diameter of from about 0.076 to about 0.192 inch.

19. A continuous process for applying and bonding a protective coating to a metallic wire substrate that comprises applying to a length of said substrate advancing at a rate of at least 200 feet per minute, a first ply of a molten polyamide resin hot melt adhesive; said polyamide hot melt adhesive comprising the condensation product of one or more alkylene diamines of the formula:

$$H_2N(CH_2)_xNH_2,$$

wherein x is an integer of from 2 to 20; and polymeric fat acids having a dimeric fat acid content greater than about 90 percent by weight; the molar equivalent of amine employed being about equal to the molar equivalent of carboxyl groups present in said fat acids; said condensation product having a softening point of 112° C. to 138° C. and a tensile strength of from 400 pounds per square foot to 600 pounds per square foot; cooling the said adhesive composition to a flow resistant state; extruding a molten extrudable thermoplastic resin composition onto said adhesive composition at a temperature within the range of 300° C. to 425° C. in a thickness of at least 0.015 inch whereby said adhesive composition is softened; and cooling, whereby said thermoplastic resin composition is bonded to said substrate by means of said adhesive composition.

20. A process as claimed in claim 1, wherein said process is continuous; said substrate is wire, and said molten resinous hot melt adhesive composition is applied at a temperature of from 300° F. to 450° F.

21. A continuous process as claimed in claim 19, wherein said wire is advanced at a rate of from 200 feet per minute to 2000 feet per minute.

22. A continuous process as claimed in claim 19, wherein said polyamide resin hot melt adhesive includes one or more of those alkylene diamines coming within the formula therein recited wherein x is an integer of from 2 to 6 inclusive, and said polyamide resin has a Brookfield melt viscosity of about 10 to 100 poises at 210° C.; and a percentage elongation of from 500 to 600.

23. A continuous process as claimed in claim 22, wherein said polyamide adhesive has a Brookfield melt viscosity of about 45 poises at 210° C.; a tensile strength of about 500 pounds per square inch; and a percent elongation of about 550.

24. A process as claimed in claim 19, wherein said extrudable thermoplastic resin is a plasticized vinyl chloride homopolymer.

25. The process as claimed in claim 19, wherein said extrudable thermoplastic plasticized resin employed is a copolymer of vinyl chloride and a vinyl ester having the structure:

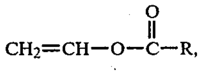

wherein R is a lower alkyl radical.

26. The process as claimed in claim 25, wherein said vinyl ester is vinyl acetate.

27. The process as claimed in claim 19, wherein said wire is advanced at about 800 feet per minute to 2000 feet per minute.

28. The process as claimed in claim 27 wherein said adhesive composition is deposited upon said wire in a thickness of about 1 to about 5 mils and said vinyl chloride homopolymer compound is extruded onto said adhesive coating in a thickness of about 0.015 to 0.025 inch.

29. The process as claimed in claim 19, wherein said wire is substantially nodule-free galvanized steel wire.

30. The process as claimed in claim 22, wherein the melt viscosity of said polyamide is about 40 to 60 at 210° C.

31. The process as claimed in claim 28, wherein said wire is galvanized steel wire having a lightly oxidized zinc surface coating.

32. The process as claimed in claim 29, wherein said wire has a cross-section diameter of from bout 0.076 inch to about 0.192 inch.

33. A process for applying a protective coating to a metallic wire and simultaneously bonding said coating thereto that comprises apply, in a first treatment zone, to a rapidly advancing length of said wire a first ply of molten hot melt polyamide adhesive as claimed in claim 19, at a temperature of from 300° F. to 425° F. to effect a bonding of said adhesive to said metallic wire; advancing said adhesive coated substrate to a second treatment zone wherein said adhesive is cooled to a solid, soft, flow-resistant state and thereafter extruding onto said cooled adhesive in a third treatment zone, a molten extrudable thermoplastic plasticized vinyl resin composition, at a temperature sufficient to melt said adhesive and effect a bond between said adhesive and said vinyl resin composition; and thereafter in a fourth treatment zone reducing the temperature of said advancing coated wire to solidify the bonded coating of adhesive and vinyl resin composition; said wire being advanced through said treatment zones at a rate of 800 feet per minute to 2000 feet per minute.

34. The process as claimed in claim 32, wherein the treatment zones wherein cooling occurs are maintained at about room temperature.

35. The process as claimed in claim 32, wherein said fourth treatment zone comprises the ambient atmosphere through which the coated wire is advanced after leaving the extruder, and a trough containing a cooling liquid medium through which said coated wire is advanced from said ambient atmosphere.

36. The process as claimed in claim 35, wherein the length of that portion of the fourth treatment zone comprising the ambient atmosphere is a span of about 10 to about 20 feet.

37. The process as claimed in claim 33, wherein said first treatment zone comprises a dipping tank containing said hot melt adhesive and through which said wire is advanced, an exit orifice being defined in the wall of said tank opposite the point of entry of said wire into said tank; said exit orifice constituting a sizing die of annular cross-sectional conformation to determine the thickness of adhesive coating applied to said wire.

38. The process of claim 33, wherein the residence time of said wire in said fourth treatment zone is from about 0.08 seconds to 6 seconds and said zone is maintained at a temperature of from about 50° to 70° F.

* * * * *